Sept. 2, 1969　　　　H. J. P. VON OHAIN ET AL　　　3,465,180
TWO COMPONENT ELECTRO-FLUID-DYNAMIC POWER
GENERATOR EMPLOYING CONTACT IONIZATION Filed May 15, 1967　　　　　　　　　　　　　　　　4 Sheets-Sheet 2

INVENTORS
HANS J. P. VON OHAIN
FRANK L. WATTENDORF

BY *Harry A. Herbert Jr.*
*Raymond J. Crowley*
ATTORNEYS

3,465,180
Patented Sept. 2, 1969

3,465,180
TWO COMPONENT ELECTRO-FLUID-DYNAMIC POWER GENERATOR EMPLOYING CONTACT IONIZATION
Hans J. P. von Ohain, Dayton, Ohio, and Frank L. Wattendorf, Paris, France, assignors to the United States of America as represented by the Secretary of the Air Force
Filed May 15, 1967, Ser. No. 639,934
Int. Cl. H02k *45/00;* G21d *7/02*
U.S. Cl. 310—11                    6 Claims

ABSTRACT OF THE DISCLOSURE

An electrical power generation apparatus in which an alkali metal vapor under high pressure is passed between closely spaced tungsten sheets whereby contact phenomena, the tungsten withdraws electrons from the alkali metal vapor producing positive ions or charged particles in the vapor stream. The vapor is passed through a series of supersonic nozzles where its pressure is reduced and its velocity increased. After passage through the expansion nozzles, the vapor is ultimately mixed with a relatively cool gas of low molecular weight (i.e. hydrogen). This causes the metal vapor to condense in tiny droplets enclosing the respective ions and serving as a very efficient means for transferring kinetic energy from the vapor stream to the ions. The vapor is then passed to a collector chamber electrically insulated from the other duct sections and serving to collect the electrical ion charges and supply electric current to an external load circuit. The remaining metal vapor in the cooling gas is discharged from the collector chamber and passed through a condenser where the metal vapor is condensed to a liquid and separated from the low molecular weight gas and each are returned for recirculation in the system.

The invention relates to improvements in electro-fluid-dynamic power generators of the general type disclosed in United States Patent 3,225,225 granted Dec. 21, 1965. In the patented system, high pressure vapor used as a carrier gas is seeded with ions by a corona type electrical discharge. The ions are accelerated by the kinetic energy of the transport gas thus raising their potential with respect to ground. The ions are separated in a collector section and supply an external load circuit.

In accordance with the present invention, high pressure alkali metal vapor is employed for transport of the ions or electrically charged particles and the ions are generated by contacting the metallic vapor with tungsten or the like which takes electrons from the vapor causing the same to become partially ionized. The working medium is expanded through a high pressure ratio, permitting a maximum conversion of heat to kinetic energy. A recirculating coolant gas at a low pressure ratio is employed to condense the alkali metal vapor into tiny droplets enclosing the ions, permitting effective coupling between the vapor and the ions.

A system in accordance with the invention is capable of operating at high current densities as compared to known prior art systems.

The specific features of the invention will become apparent from the detailed description hereinafter given when taken in conjunction with the accompanying drawings in which.

Figure 1:
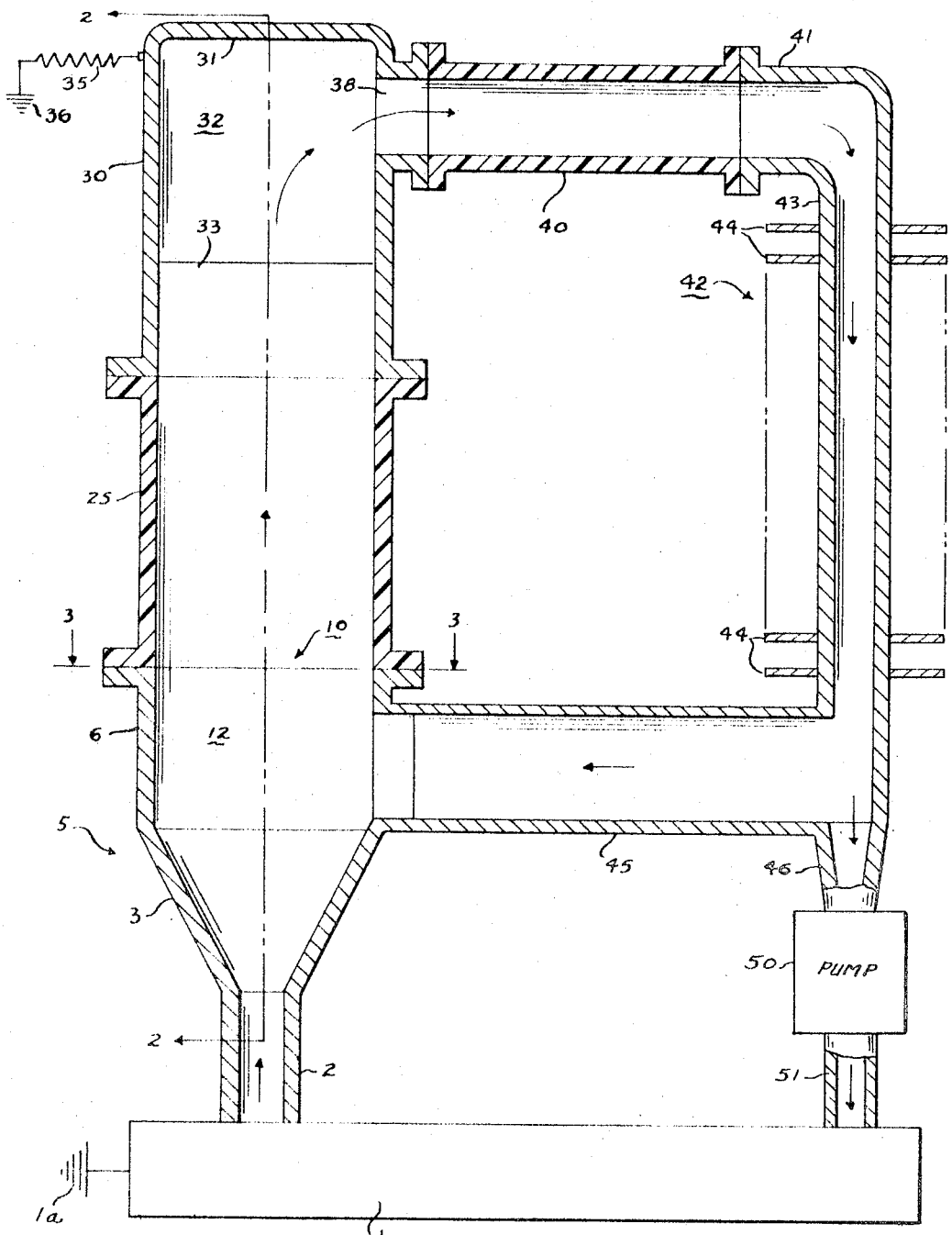
FIG. 1 is a sectional side elevationl view of a system in accordance with the invention.

With reference now to FIG. 1, the reference numeral 1 generally illustrates schematically a boiler adapted to contain an alkali metal such as sodium or caesium, preferably the latter. The boiler 1 may be of any suitable design such as employed many years ago in mercury vapor turbine power plants and electrically grounded as indicated at 1*a*. Fuel such as coal, oil or a nuclear source of heat may be employed to heat the boiler such as to produce a metallic vapor under high pressure which passes out of the outlet conduit 2 into the conical entrance 3 of a duct section 5, the upper end 6 of which is of square cross section (note FIG. 3).

Metallic vapor under high pressure passing through the entrance section 3 of the duct section 5 passes into an ionizer structure generally indicated by the reference numeral 10 and physically housed in the rectangular upper end 6 of the duct 5.

Figure 3:
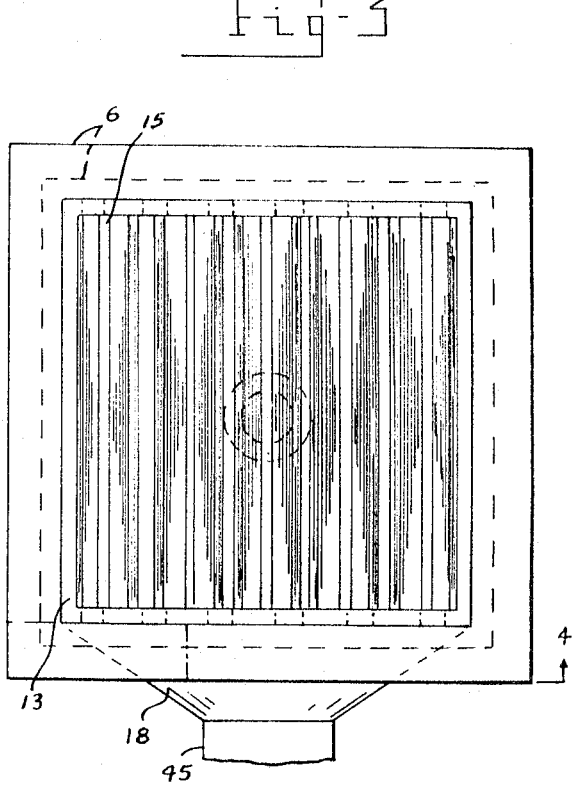
FIG. 3 is an enlarged horizontal sectional view of the ionizer section of the device of FIG. 1 taken on line 3—3 of FIG. 1.
Figure 2:
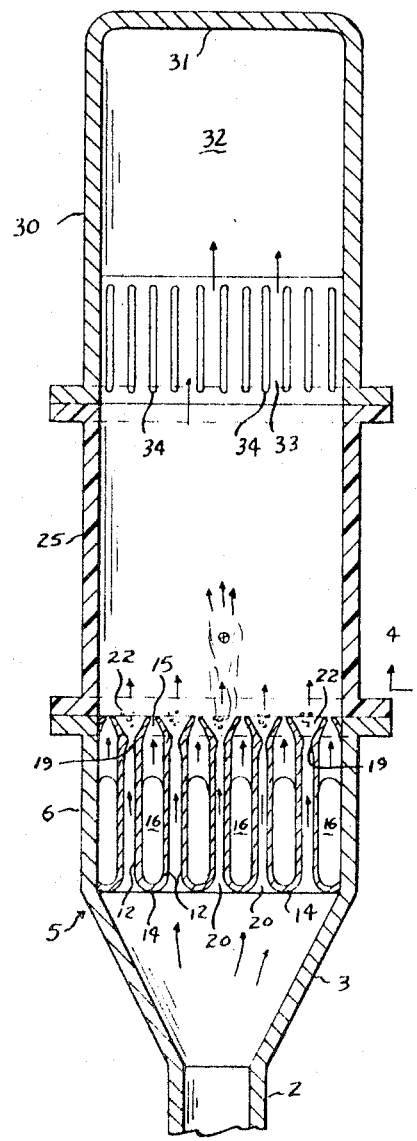
FIG. 2 is an end sectional view taken on line 2—2 of FIG. 1 illustrating details of the ionizer section.
Figure 4:
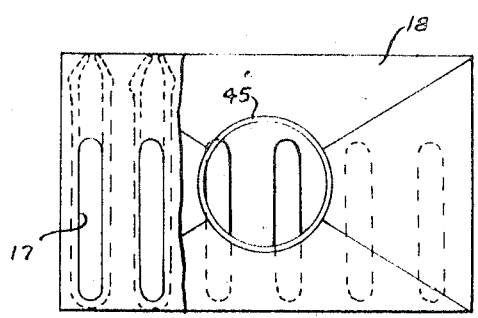
FIG. 4 is a sectional view taken on line 4—4 of FIG. 3 and illustrating the means for introducing cooling gas to the ionizer structure.

As seen in FIGS. 2 and 3, the ionizer section 10 includes a plurality of thin sheets or plates of tungsten or the like 12 of rectangular shape extending in parallel spaced relation and brazed or otherwise secured to a rectangular wall member 13 adapted to fit snugly into the upper end 6 of the duct 5. The plates 12 are arranged in related pairs formed from a unitary sheet of metal bent into U-shape with the parallel sides 12 joined by the curved bottom portion 14. The plate sides 12 are bent inward adjacent their upper ends to form an elongated jet nozzle opening 15 extending the full width of the plate assembly. The nozzle passage 15 directly communicates with the space 16 enclosed by each pair of plates 12 and curved bottom portion 14. When each assembly of a pair of the plates 12 is brazed or welded into the rectangular frame 13, the chambers 16 of each pair would be sealed at its ends. Elliptical shaped holes 17 are cut through one of the walls of the frame 13 (FIG. 2) providing a passage connecting each chamber 16 with a hollow tapered pipe connection 18 (FIG. 3), adapted to be connected to a coolant gas return conduit 45 (FIG. 1), the function of which will be later described.

Again, with reference to FIG. 2, it will be noted that each tungsten sheet 12 of a related pair at its upper and, outer side is thickened and contoured in cross section to the form of one-half of a supersonic nozzle as indicated at 19. When two paired assemblies of plates 12 are arranged in side-by-side spaced relation, a passage 20 is formed therebetween terminating in the supersonic nozzle 19 having an exit diffuser section 22 extending the full width of the rectangular frame 13 (note FIG. 3). High pressure metallic vapor passing from the tapered entrance section 3 of duct 5 will pass into a plurality of the passages 20 and contact the tungsten sheets 12 forming the sides of the passage. Since the width of the passages 20 in the actual machine will be quite small, the metallic vapor (caesium) will come into extensive contact with the tungsten material and through a phenomena known as contact ionization, the tungsten will absorb electrons from some of the caesium atoms leaving positively charged ions or colloidal particles in the vapor stream. The phenomena of contact ionization is per se known in the art. See: "Ion Propulsion for Space Flight," by Ernst Stuhlinger, Mc-Graw-Hill Book Company, pages 182 through 197 inclusive.

The high velocity streams of alkali metal vapor issuing from the divergent sections of the supersonic nozzles 19 by aspirator pump action cause hydrogen cooling gas to flow from the conduit 45, ports 17, chambers 16 and nozzles 15. Because the nozzles 15 spout hydrogen gas streams in the immediate vicinity of the alkali metal vapor streams, the streams readily intermix. As previously noted, the relatively cool hydrogen gas causes condensation of the alkali metal vapor into tiny droplets which enclose the ions individually and provide effective coupling between the charges and the gas stream.

The rectangular section 6 of the duct 5 connects to a similarly shaped hollow duct 25 made of electrically insulating material such as a ceramic liner wound with resin impregnated fiberglass so as to withstand pressure. It will be noted that all duct sections are provided with peripheral flanges at their mating ends to permit joinder by means of bolts or other fastening means, not shown.

The rectangular duct section 25 serially connects to a similarly shaped metal housing or duct 30 closed at its outer end by a wall 31. The interior of housing 30 forms a chamber 32, the entrance to which is provided with a series of conducting thin metal plates 33 of rectangular shape arranged in parallel laterally spaced relation (see FIG. 2). The plates 33 are brazed at their ends to the metal housing 30 and have passages formed by the space between the plates, as indicated at 34 allowing the mixed flow of cooling gas (hydrogen) and alkali metal vapor (caesium) to pass over the metal plates 33 and flow into the chamber 32. In flowing over the metal plates 33, the ions contained in the alkali metal vapor give up their electrical charges which collect on the surface of housing 30 and are bled off to supply an external electrical load 35 connected to the closure wall 31 of the chamber 32 (see FIG. 1). The electrical load 35 is electrically grounded, as indicated at 36.

The chamber 32, termed a collector chamber, is connected adjacent its upper end by means of a port 38 (FIG. 1) with a hollow cylindrical conduit section 40 made of an electrically insulating material. The conduit 40 connects at its outer end with the inlet 41 of a tubular heat exchanger or radiator generally indicated by reference numeral 42 and including one or more cylindrical tubes 43 with external cooling fins 44. Mixed alkali metal vapor and cooling gas enter the radiator 42 and the vapor condenses to liquid metal which separates from the cooling gas which is passed by a lateral conduit 45 directly to the pipe connection 18 (see FIG. 3) for recirculation by means of ports 17, chambers 16 and nozzles 15.

Liquid alkali metal drops condensed out in the radiation assembly 42 collect in a sump 46 and are withdrawn by an electrically driven mechanical pump 50 and returned by a pipe 51 to the boiler 1.

The system as above described with reference to FIGS. 1 to 3 inclusive, operates as follows. Alkali metal heated in the boiler 1 forms a high temperature high pressure vapor similar to steam and passes by way of outlet conduit 2 into the conical entrance 3 of a duct 5 having a rectangular upper portion 6 housing an ionizer assembly 10. The gaseous metal, as previously described, flows through passage 20 formed between adjacent pairs of parallel plates 12 and contact with the tungsten material of plates 12 ionizes some of the metal vapor. The metal vapor or gas then passes through the supersonic nozzles 19 in parallel streams and issues from the divergent sections 22 (FIG. 2) with low pressure and high velocity. Even though greatly expanded, only a small amount of the metal vapor will condense. In order to insure substantially complete condensation in passage through the conduit section 25 where the potential of the ions is increased at the expense of the kinetic energy of the alkali metal gas stream, a low molecular weight coolant gas (hydrogen) is introduced to cause the vapor to condense in tiny droplets surrounding the ions and giving a maximum energy transfer thereto. The coolant gas from pipe connection 18 passes into the chambers or pockets 16 formed by bending a single sheet of tungsten into a U-shape with the parallel sheets 12 forming the upstanding legs of the U. The chambers 16 have discharge nozzles 15 which can discharge the coolant gas by aspirator action directly into the low pressure zones caused by discharge of the metal vapor from the adjacent supersonic nozzles 19. Thorough mixing of the metal vapor and coolant gas occurs in a short distance and condensation and energy exchange to the ionized particles occurs as the mixed gases proceed upward through the converter section, conduit portion 25.

The combined gas stream in passing from the conduit portion 25 is really a fine mist of droplets of alkali metal suspended in the coolant gas stream. The droplets containing ions or ionized particles in contacting the electrical collector plates 33 at the entrance to the collector chamber give up their electric charges which have been elevated to a high potential with respect to ground.

The charges collected by the plates 33 collect on the housing 30 as on an equipotential surface and pass off as a current to the external electric load 35. Since the process is continuous, the load is continuously supplied.

Metal vapor and coolant gas pass into the heat exchanger or cooler 42 where heat of the vapor mist is given up to the heat exchanger walls and cooling fins and coalescence of the fine droplets into liquid metal is complete and the liquid metal and coolant gas separate and are respectively recycled in the system.

It will be noted that pressure changes on the coolant gas in completing its circuit are small and the pumping losses at the expense of the input energy of the alkali metal primary working medium are small.

Figure 5:
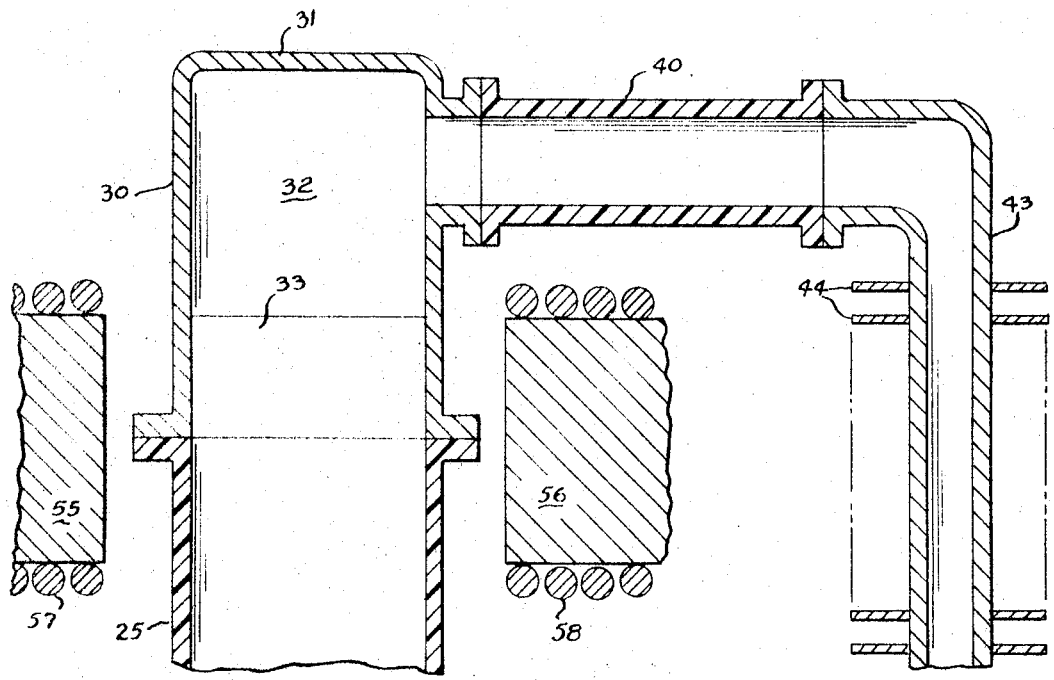
FIG. 5 is a view similar to FIG. 1, illustrating the use of a magnetic field for controlling the space charge in the system of FIG. 1.

The equipment of FIGS. 1 through 3 may be employed for a space charge neutralized hybrid process. In such a process, electrons within the conversion section, insulated duct section 25, are employed to neutralize the space charge of the positively charged colloidal particles. To prevent the electrons from migrating toward the positively charged collector electrode, plates 33 and collector housing 30, a magnetic field of suitable field line structure and intensity distribution is employed. A schematic arrangement is illustrated in FIG. 5 in which parts identical to the device of FIG. 1 are indicated by corresponding reference numerals. In this figure, the poles of an electromagnet 55 and 56 energized by windings 57 and 58 respectively create a magnetic force field adjacent the upper end of the duct section 25 and the lower end of the collector housing section 30. The lines of magnetic force create a field which resists passage of electrons therethrough in upward passage through the conduit section 25 (the conversion section).

Figure 6:
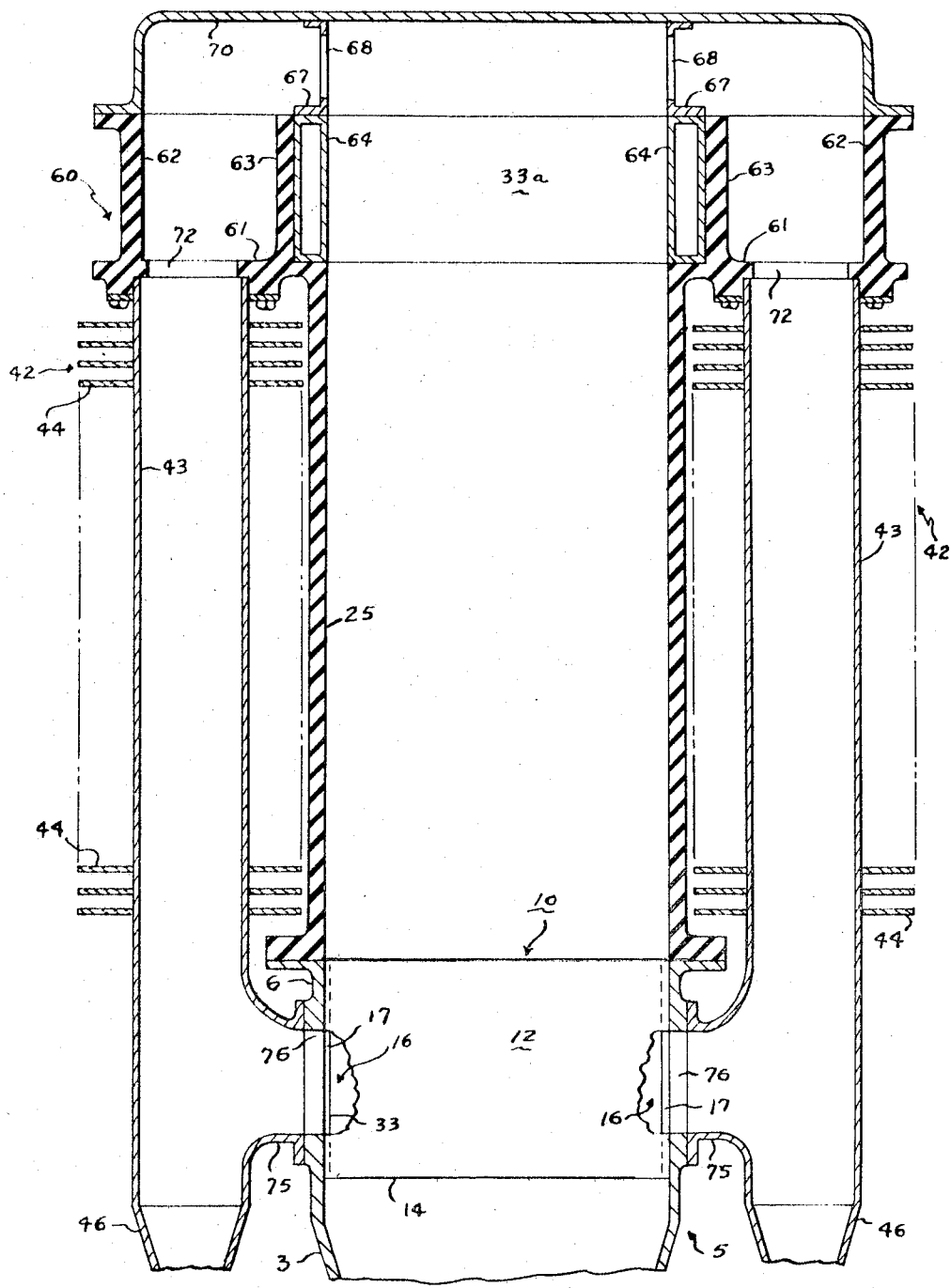
FIG. 6 is a side elevation in section illustrating a re-arrangement of portions of the structure of the device of FIG. 1 to obtain a more compact assembly.

FIG. 6 illustrates a re-arrangement of portions of the device (FIGS. 1 to 3 inclusive) to provide a compact structure capable of operation at a high capacity. In this figure, parts identical to those of FIGS. 1 to 3 inclusive, are indicated by corresponding reference numerals.

In this arrangement of the invention, the duct section 5, upper rectangular section 6 thereof and ionizer section 10 are similar to that disclosed in the device of FIG. 1. The two component working fluids (alkali metal vapor and hydrogen) are discharged into a duct section 25 similar to the corresponding duct section 25 of FIG. 1, and made of suitable insulating material.

The duct section 25 at its upper end has integrally formed thereon a circular bowl shaped section 60 having a bottom portion 61 and an outer vertical wall 62. The bottom wall 61 is apertured to form an outlet for the conversion duct section 25 and is provided with a rectangular vertical wall 63 serving to form a receptacle for a rectangular frame 64 formed with a hollow interior 65 adapted to be connected to an external source of circulating cooling fluid, not shown. The electrical charge collecting vanes 33a are constructed as hollow streamlined tubes, as shown, and extend in parallel spaced relation across the frame 64. The frame 64 has two of its oppositely disposed end walls apertured to receive the ends of the hollow vanes 33a which can then be brazed in place to allow cooling liquid from a source not shown to circulate through the vanes. The hollow frame 64 and assembly of vanes 33a are suspended by means of metal channels 67. The channels 67 are apertured at 68 to permit free flow of the binary working fluid therethrough. The upper sides of the channel members 67 are secured to the circular dome member 70. The dome 70 made of metal serves as a collector for the electrical charges collected by the collector plates 33a. The dome 70 is supported around its periphery by the upper side of the circular wall 62 of insulating material and secured fast thereto. The bottom wall 61 of the bowl section 60 is suitably apertured on each side as indicated at 72 to form flow passages communicating with a respective tubular finned radiator assembly 42 of the same type as employed in FIG. 1 with the tube indicated by reference numeral 43 and the radially extending fins as 44. Each of the tubular radiators 42 adjacent their lower ends connect to a lateral tubular conduit 75 adapted to connect to an elongated port 76 on opposite end walls of the rectangular section 6 at the upper end of the conduit section generally indicated at 5 in FIG. 1. The port 76 registers with the ports 17 in each of the two opposed end walls 33 of a rectangular frame serving to support the assembly of ionizing plates 12. The ports 17 admit cooled gas (hydrogen) from radiator tubes 43 to flow into the chambers 16 formed between pairs of ionizing plates 12 as described previously with respect to FIGS. 1 and 2.

Alkali metal vapor, condensed fully to a liquid in radiators 42, collects in sumps 46 formed on the bottom of each radiator tube 43 and returned to boiler 1 by a recirculation pump, not shown, in the same manner as described with respect to FIG. 1.

The device of FIG. 5 operates functionally in a manner identical to that of the device previously described with respect to FIGS. 1 to 3 inclusive.

We claim:
1. In an electrical power generating device of the character described, a fuel fired boiler adapted to contain a molten supply of alkali metal and to generate a high pressure output of alkali metal vapor, a duct connected to said boiler to receive the output of high pressure alkali metal vapor therefrom, said duct having an inlet section provided with a series of tungsten plates adapted to be directly contacted by the high pressure alkali metal vapor, the said metal vapor having at least portions thereof electrically ionized by said contact, a plurality of supersonic nozzles adapted to receive the high pressure flow of alkali metal vapor after contact with said tungsten ionizer plates, said supersonic nozzles increasing the kinetic energy of the metal vapor stream at the expense of the pressure head thereof, a second set of nozzles positioned in said duct entrance section adjacent said supersonic nozzles and connected to a supply of low molecular weight cooling gas whereby to thoroughly intermix the cooling gas with the expanding alkali metal vapor discharged from said supersonic nozzles, a conduit section downstream from said nozzles electrically insulating the mixed metallic vapor and cooling gas and the metallic vapor expanding and condensing at least in part into small liquid alkali metal droplets which surround the ions forming electrically charged colloidal particles, the charged colloids being accelerated by absorbing kinetic energy from the mixed gas stream, a third conduit section connected in series with said second conduit section, electrical charge collector electrodes positioned at the entrance of said third conduit section, said charge collector electrodes being adapted for electrical connection to an external electrical load, a heat dissipating radiator connected to said third duct section to receive the mixed gas flow therefrom, said radiator condensing said alkali metal vapor to liquid metal and separating the same from the cooling gas, means connecting the radiator to the said second set of nozzles so that cool low molecular weight gas may be recycled in the system, said radiator having a liquid alkali metal sump, and pump means for withdrawing the alkali metal from the sump and returning the same to the boiler.

2. The structure as claimed in claim 1 in which the tungsten contact ionizer plates are formed on their upper outer portions on one side with the contour of one half of a supersonic nozzle including inlet, throat and divergent sections, a related pair of said plates when placed opposite each other in spaced relation forming an entrance channel terminating in a supersonic nozzle extending throughout the width of the plate.

3. The structure as claimed in claim 1, in which said tungsten contact ionizer plates are positioned across said first named duct adjacent the exit thereof in spaced parallel relation, said plates being arranged in sets with two plates to a set, each of said sets being in the form of a U with a curved entrance nose portion and two parallel spaced upright leg portions, the upright leg portions being bent inward adjacent their upper ends to form a jet nozzle extending the full width of each set, the hollow interior of each set being connected to a source of cooling gas adapted to be discharged from said nozzles.

4. The structure as claimed in claim 1 in which the inlet section of said duct adapted to receive the supply of alkali metal vapor under high pressure is provided adjacent its exit end with a rectangular portion in cross section, said rectangular portion having a plurality of hollow vanes extending thereacross in parallel spaced relation, each of said hollow vanes having a jet discharge nozzle formed along the entire trailing edge thereof, an elongated port formed in at least one side of said rectangular duct portion communicating with the hollow interior of each of said vanes, a cooling gas supply connected to said elongated port, the space between said vanes forming passages for the flow of the high pressure alkali metal vapor therethrough and supersonic nozzles positioned at the discharge end of the passages between said vanes.

5. The structure as claimed in claim 1 in which means forming magnetic poles are positioned adjacent the junction between said second and third named duct sections, the lines of magnetic force extending across sections and forming a barrier to the transport of electrons downstream from said second duct section into the charge collector elements at the inlet of said third named duct section.

6. An electro-fluid-dynamic power generation apparatus of the character described comprising a source of high pressure, high temperature metallic caesium vapor, a duct connected to said vapor source, a large area tungsten contact ionizing means in said duct and having a plurality of flow passages for the metallic vapor therethrough, a plurality of supersonic nozzles adapted to receive the vapor flow from said ionizer passages, a further duct section forming an expansion chamber extending downstream from said supersonic nozzle, means to introduce a cool gas of low molecular weight such as hydrogen into said expansion chamber at the entrance end thereof adjacent the discharge of each of said supersonic nozzles to mix intimately with the discharge therefrom, electrical charge collecting electrodes positioned adjacent the discharge end of said expansion chamber, means defining a collector chamber housing said collector electrodes, a radiator section electrically insulated from said collector chamber, but adapted to receive the dual component working fluid discharged from the collector chamber, separation of the liquid caesium metal and hydrogen cooling gas being completed in said radiator section and means operatively connected to said radiator section for respectively returning the metal condensate and cooling gas for recirculation in the power generation system.

References Cited

UNITED STATES PATENTS

| 2,827,577 | 3/1958 | Kimberlin et al. | 310—5 |
| 3,225,225 | 12/1965 | Wattendorf et al. | 310—6 |

DAVID X. SLINEY, Primary Examiner

U.S. Cl. X.R.

310—7